United States Patent
Gits et al.

(10) Patent No.: US 7,586,877 B2
(45) Date of Patent: Sep. 8, 2009

(54) METHOD AND SYSTEM TO DETERMINE AND COMMUNICATE THE PRESENCE OF A MOBILE DEVICE IN A PREDEFINED ZONE

(75) Inventors: Peter Michael Gits, Clarendon Hills, IL (US); Dale James Seavey, Sunol, CA (US); David J. Novice, Baltimore, MD (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 11/279,714

(22) Filed: Apr. 13, 2006

(65) Prior Publication Data

US 2007/0243880 A1 Oct. 18, 2007

(51) Int. Cl.
*H04Q 7/00* (2006.01)

(52) U.S. Cl. ............... 370/331; 370/332; 370/341; 370/458; 370/347; 370/329; 455/456.1; 455/404.2; 455/434; 455/456.2; 455/509; 455/436

(58) Field of Classification Search ............... 370/331, 370/347, 458; 455/404.2, 456.1, 456.3, 456.2
See application file for complete search history.

(56) References Cited

U.S. PATENT DOCUMENTS

| | | | | |
|---|---|---|---|---|
| 5,293,645 A * | 3/1994 | Sood | .................. | 455/456.2 |
| 5,613,205 A * | 3/1997 | Dufour | .................. | 455/440 |
| 6,061,337 A * | 5/2000 | Light et al. | .................. | 370/331 |
| 6,504,825 B1 * | 1/2003 | Atkins et al. | .................. | 370/254 |
| 6,519,464 B1 * | 2/2003 | Santhoff et al. | .......... | 455/456.5 |
| 6,542,749 B2 * | 4/2003 | Tanaka et al. | ............ | 455/456.1 |
| 6,591,112 B1 * | 7/2003 | Siccardo et al. | ............. | 455/521 |
| 6,716,101 B1 * | 4/2004 | Meadows et al. | ......... | 455/456.1 |
| 6,775,552 B2 * | 8/2004 | Link, II | .................. | 455/456.1 |
| 6,845,239 B1 * | 1/2005 | Sato et al. | .................. | 455/456.1 |
| 6,885,874 B2 * | 4/2005 | Grube et al. | ................. | 455/520 |
| 6,947,435 B1 * | 9/2005 | Chikuma et al. | ............. | 370/412 |
| 6,947,755 B1 * | 9/2005 | Gould et al. | .............. | 455/456.5 |
| 6,952,574 B2 * | 10/2005 | Tealdi et al. | .............. | 455/404.2 |
| 6,952,645 B1 * | 10/2005 | Jones | .......................... | 701/201 |
| 6,954,644 B2 * | 10/2005 | Johansson et al. | ........... | 455/438 |
| 6,973,333 B1 * | 12/2005 | O'Neil | .................... | 455/569.2 |
| 6,975,873 B1 * | 12/2005 | Banks et al. | .............. | 455/456.5 |
| 7,015,817 B2 * | 3/2006 | Copley et al. | ............ | 340/573.4 |
| 7,085,577 B1 * | 8/2006 | Katsuno et al. | ........... | 455/456.3 |
| 7,089,107 B2 * | 8/2006 | Jones | .......................... | 701/201 |

(Continued)

*Primary Examiner*—Marceau Milord
(74) *Attorney, Agent, or Firm*—Schwegman, Lundberg & Woessner, P.A.

(57) ABSTRACT

A method and system to provide a notification is described. The system may comprise a first mobile device including a positioning component to determine when the first mobile device is proximate at least one predefined zone (e.g., enters, remains within or leaves the predefined zone), and a location data compiler to compile location data which includes a zone identifier corresponding to the at least one predefined zone. The first mobile device may further comprise a device identifier and a transmitter to send the location data and the device identifier to at least one recipient associated with the at least one predefined zone. The system may include a second mobile device associated with the at least one recipient and including a receiver to receive the location data from the first mobile device, and a display to display the location data and the zone identifier on the second mobile device.

22 Claims, 5 Drawing Sheets

U.S. PATENT DOCUMENTS

| | | | |
|---|---|---|---|
| 7,139,583 B2 * | 11/2006 | Yamasaki et al. | 455/456.1 |
| 7,142,876 B2 * | 11/2006 | Trossen et al. | 455/456.3 |
| 7,149,533 B2 * | 12/2006 | Laird et al. | 455/456.3 |
| 7,171,227 B2 * | 1/2007 | Baratz et al. | 455/512 |
| 7,221,939 B2 * | 5/2007 | Ylitalo et al. | 455/435.1 |
| 7,313,405 B2 * | 12/2007 | Tanabe | 455/456.2 |
| 7,366,533 B2 * | 4/2008 | Biggs et al. | 455/509 |
| 7,400,892 B1 * | 7/2008 | Banks et al. | 455/456.5 |

* cited by examiner

METHOD AND SYSTEM TO DETERMINE AND COMMUNICATE THE PRESENCE OF A MOBILE DEVICE IN A PREDEFINED ZONE

FIELD

The present application is related to the field of determining the location of a mobile device, and in an example embodiment to a method and system to determine and communicate the presence of a mobile device in a predefined zone to a predefined list of recipients.

BACKGROUND

Certain mobile devices may include GPS or Assisted GPS (AGPS) location services that have the capability of reporting the mobile device's raw GPS/AGPS location data. This raw location data may be fed into a mobile service provider system, and ultimately to a client system that reports the device's location data through the use of online street maps.

The majority of location data may be used by companies that track the location of a truck or some other asset of the company. However, this raw location data is constantly being sent to the service provider at predetermined intervals, with the reporting of such location data not being at the discretion of the driver but at the company that owns the truck. Thus, the user of this feature does not have the ability to define those conditions when his or her location should be reported.

DETAILED DESCRIPTION

Figure 1A:
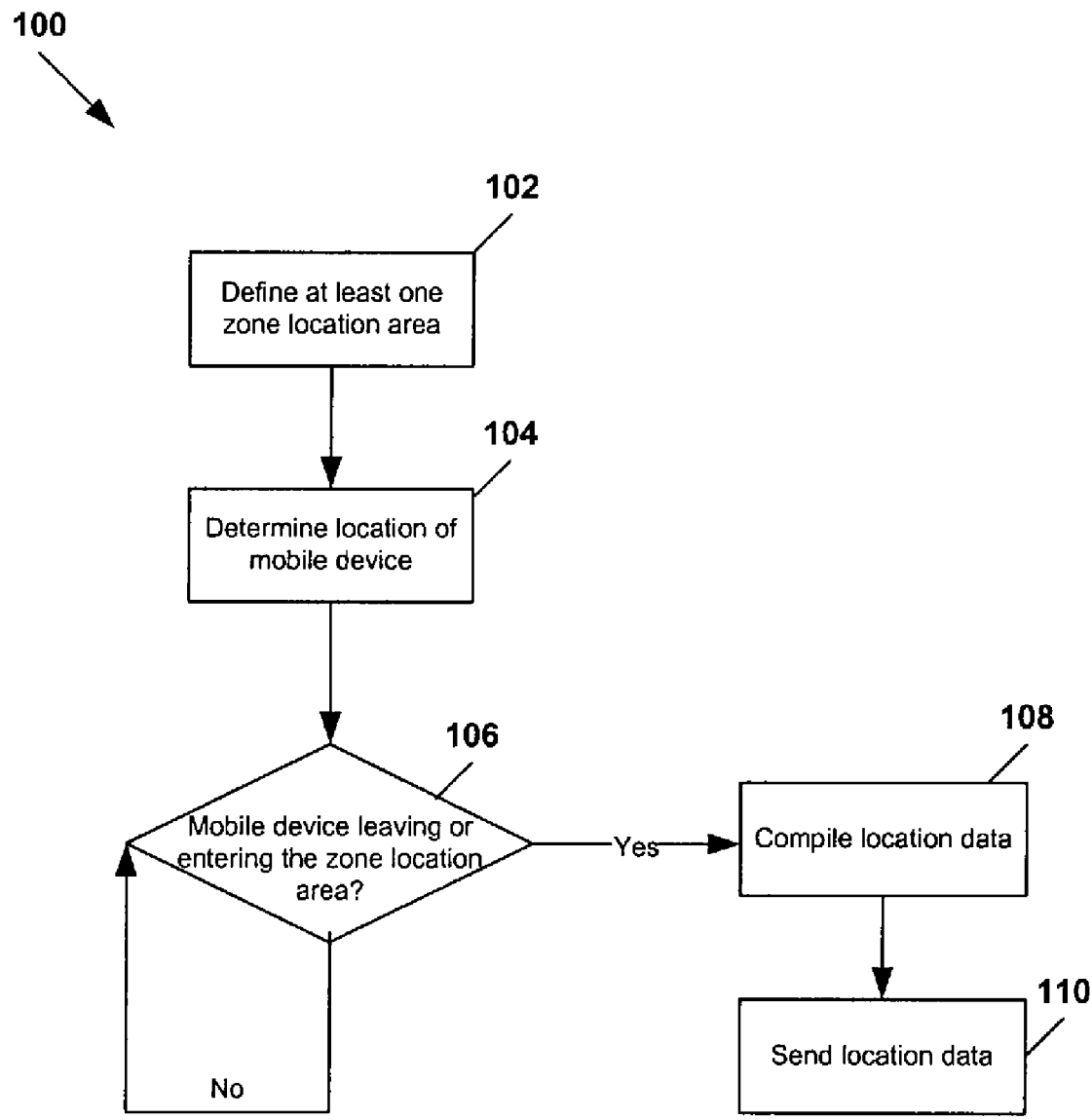
FIG. 1A shows a flow chart to illustrate a method, according to an example embodiment, that can be used to determine and communicate the presence of a mobile device in a predefined zone.

Referring to FIG. 1A, in an embodiment, a method 100 is shown to detect and communicate the presence of a mobile device (e.g., a cellular telephone, networked PDA, or any other mobile communication device) proximate (e.g., entering, leaving or remaining within) a predefined zone associated with the mobile device. An initial operation of defining at least one zone for the mobile device is shown in block 102. In an example embodiment, a plurality of zones is predefined for the mobile device.

The method 100 comprises determining the location of the mobile device, as indicated by block 104. This may be done using GPS/AGPS technology, 802.11-type communications, cellular base station triangulation, or RFID technology and the location may be determined at regular, predefined intervals. In an example embodiment, the method includes determining the coordinates of the mobile device.

Thereafter, a decision block 106 queries whether the mobile device is entering or leaving any of the zones associated with the mobile device. This query loops until it is determined that the mobile device is entering or leaving an associated zone. This serves as a trigger to compile location data, as indicated by block 108, the location data including an identifier corresponding to the zone. Thus, the location data may be sent only at the transition of entering or leaving a predefined zone. The location data may also include the determined coordinates of the mobile device. In an example embodiment, the determination is made on the mobile device itself and the raw location data of the mobile device is not communicated from the mobile device. However, a message may be communicated identifying a pre-defined location as described in more detail below.

Returning to the method 100, the location data (or message) is sent to at least one predefined recipient, as indicated by block 110. The at least one predefined recipient may have an associated remote device. In an example embodiment, the location data is displayed on a display screen of the remote device.

In an example embodiment, the mobile device itself performs the operations of determining its location, compiling the location data and sending the location data. In addition, the plurality of predefined zones may be carried by the mobile device itself, each predefined zone having a corresponding identifier. Thus, the mobile device may include a user interface that allows a user to define selected geographical locations or zones to be monitored as well as a list of predefined recipients (e.g., arranged in a buddy group). Thus, for example, when a member of a buddy group leaves (or enters) one of the zones defined on his or his mobile device, a message may be communicated to all buddies in the buddy list. For example, a pop-up may appear on his or her buddy list informing the buddies of the event. For example, assume that the buddy list comprises Peter, Dale and David and the Starbucks in Willow Glen has been defined as a zone. When Peter arrives at Starbucks an example message such as "Peter is at Starbucks in Willow Glen" may be communicated to Dale's mobile device and David's mobile device. A similar message may be communicated when Peter leaves the Starbucks.

The plurality of predefined zones on the mobile device may be set up either using the mobile device itself or via a remote application that can communicate the necessary information to the mobile device. For example, the zones may be provided on the mobile device, as follows:

1. A small midlet may be provided on the mobile device, the mobile device being able to determine its current location using any technology to determine a geographical location. The midlet may generate a user interface or prompt screen on the mobile device requesting information. For example, user interface may allow a user to enter a label for the area that the mobile device is at, and a radius for defining an area around the identified location of the mobile device. Once this information has been captured, the midlet may then update the newly defined zone onto the mobile device. It is to be understood that definition of the zone is not restricted to a radius but to any data defining a bounded physical area. Thus the zone may be of any shape (and may also include a vertical component e.g., a particular floor in a department store).

2) In an example embodiment, use may be made of any one of a number of maps provided on the mobile device, such as Google™ maps. The map may be used to type in an address that defines a required zone, with the map then retrieving the associated geographical location coordinates (e.g., GPS coordinates). In an example embodiment, a user may then right click on the retrieved coordinates, and may then submit the coordinates to define a new zone, after the user has entered the required label and radius information, as described above by way of example.

3) In another example embodiment, the user may go to a web page that allows the user to manually enter the geographical location coordinates (e.g., GPS coordinates) that define the required zones. Again, the user may be prompted to enter a label and a radius information (any data defining a bounded physical area), with the resulting newly defined zones then being sent to the mobile device, and then stored thereon.

Instead of using a coordinated point and radius, the zones may be defined in terms of a plurality of coordinates. The zones may be associated with the mobile device may be predefined by the user of the mobile device or by the at least one predefined recipient.

In one embodiment, the location data may be sent to the at least one recipient in the form of an SMS. Alternatively, the location data may take the form of telephone call with a recorded message, which then gets sent to the remote device. In this regard, the remote device associated with the at least one predefined recipient may take the form of a mobile device, a set top box, PDA or a computer. In an example embodiment, the location data may be sent over a network socket, such as TCP or TLS socket, to a predetermined server. The server may then forward this information to at least one recipient (e.g., authorized viewer(s) of a notification).

In one embodiment, the method may include providing a timestamp on the location data (or message), the timestamp corresponding to when the mobile device enters or leaves the zone. The mobile device may thus include functionality to ascertain when a person enters and leaves a zone.

As mentioned above, in an example embodiment, the method may include providing a predefined label associated with each identifier of the plurality of zones, so that the location data may include the predefined label associated with the zone that the mobile device is within. Thus, the label and device data (e.g., member of a buddy group associated with the device) may be communicated without any raw GPS data.

In a further embodiment, the at least one predefined recipient may be stored on the mobile device. The at least one predefined recipient may be predefined by a user of the mobile device or by the at least one predefined recipient. The at least one predefined recipient may also define a peer group or buddy group, so that the current location of the mobile device may be shared with members of the peer or buddy group. Each zone may have a different group of recipients assigned to it. The association between the mobile device and a buddy group may be performed on the mobile device itself or that a server remote from the mobile device.

Figure 1B:
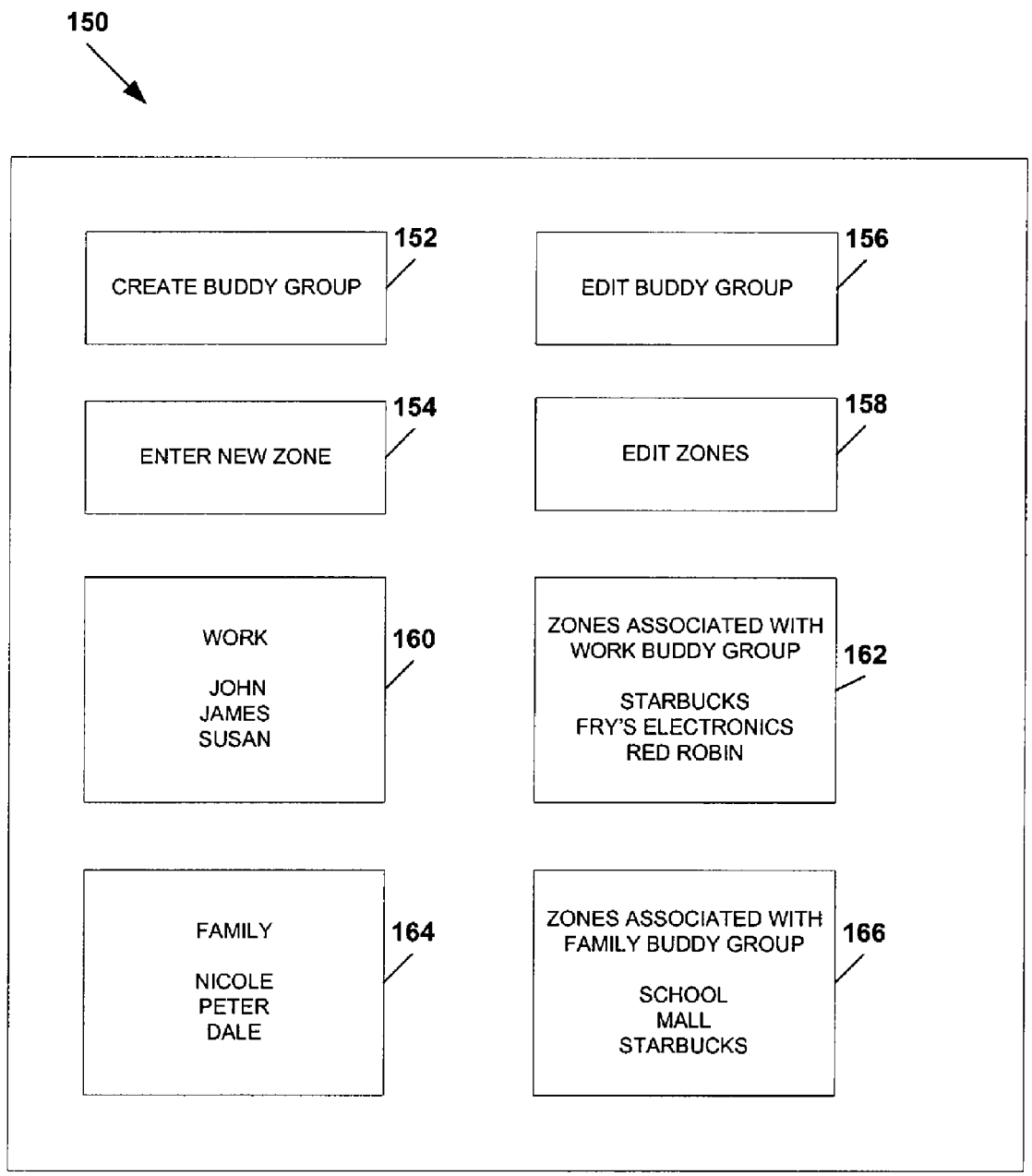
FIG. 1B graphical user interface (GUI) provided on a mobile device to configure a buddy list.

Referring to FIG. 1B of the drawings, reference 150 generally indicates an example graphical user interface (GUI) to allow a user of a mobile device (e.g., a cellular telephone) to create and manage a buddy list or group. For example, a soft button 152 may be used to create a new buddy group, a soft button 154 may be used to enter a new zone or location associated with a buddy group, a soft button 156 may allow a user to edit a buddy group, and a soft button 158 may allow a user to edit or modify data as associated with a zone. It is to be understood that various other soft buttons (or any user input arrangement) may be provided on the graphical user interface 150 or as a separate button or buttons on a keypad. The graphical user interface 150 is also shown to display a work buddy group 160 which may have zones 162 associated therewith. One or more further buddy groups, e.g. a family buddy group 164, may be provided. As in the case of the work buddy group 160, the family buddy group 164 is shown to include zones 166 associated therewith. Thus, different zones or locations may be associated with one or more different buddy groups. In an example embodiment, the graphical user interface 150 may be integrated (or communicate) with an Instant Message client (e.g., Jabber or the like).

It is to be understood members of a buddy group or list may overlap. Thus a particular zone may be associated with one or more buddy groups. When the bearing/user of the mobile device enters or leaves a particular zone, all buddy groups associated with this zone may receive messages. In addition or instead, a particular buddy group may be associated with a particular zone (or zones) and not with other user defined zones. Thus, only those buddies associated with the particular zone may be notified when the bearer is proximate that zone. For example, a "rules engine" may be provided that runs in the network (not necessarily part of a server as such but running in the network). The rules engine may allow each buddy group to have a different set of rules that are applied to a different set of buddies.

For example, a user may define two groups of buddies in his or her mobile device. One group may be named "Buddy Bowlers" and the other group may be named "FountainMasters". The first group of buddies "Buddy Bowlers" may include buddies Gimpy, Knuckles, and Lefty and may be shown in the user's view list. When the user arrives or leaves a predefined zone (e.g., "West Suburban Lane Bowling Alley") Gimpy, Knuckles, and Lefty are notified. The other group (e.g., "Fountain Masters") may never see this notification. The user may in fact not want the other group to know that he has a buddy group associated with bowling. For the other example group (Fountain Masters) there may be a predefined zone or location (e.g., named "Paiges") that is a fountain shop in Hinsdale. When the user enters or leaves Paiges, the user's list or buddy group of "Fountain Masters" may get notified. The "Buddy Bowlers", Gimpy, Knuckles, and Lefty don't receive this notification. Thus various levels of segregation may be provided that allows a user to define multiple buddy groups and define buddies associated with the group. Different buddy groups may be associated with one or more zones or locations. In an example embodiment a special rule for each buddy group or list gets defined for an associated zone or location. In an example embodiment, this can be handled in the network with a rules engine that determines, based on a set of rules, which target buddy group is notified. Both groups could be notified when the user enters another predefined location (e.g., when the user enters or leaves the "high school").

The mobile device may be configured either with the user's knowledge or without. For example, when used to monitor the whereabouts of a child, a parent may configure the child's mobile device (e.g., GPS enabled cellular telephone) to communicate messages to a mobile device of the parent when the child enters of leave predefined locations (e.g., a school, the mall, etc.).

In use, when a user having a mobile device that has been preconfigured with zones, and it is determined that the user has entered any one of the predefined zones, the methodology and apparatus described herein may retrieve the label corresponding to the predefined zone, and associated identify recipients (e.g., an associated buddy list). A message including the aforementioned information as well as the relevant time to the recipients. Similarly, when it is determined that that user has left any one of the zones, the preconfigured recipients may receive a notification that the user has left, with the present application retrieving the label corresponding to the predefined zone, and communicating these two sets of data as well as the relevant time to the recipients. In an example embodiment identification of the intended recipients may be done on the mobile device. Instead, an associated recipient list or buddy list may be provided a remote server and, accordingly, identification of the intended recipients may then be determined at the remote server.

As mentioned above, the location data may be sent over a network socket, such as TCP or TLS socket, to a predetermined server. The server may then forward this information to a group of intended recipients (e.g., an associated buddy group or authorized viewers). Thus, the server may execute logic (or rules) to customize updates to recipients of the location information based on, for example, the mobile device and the recipient(s) or buddy group(s). Thus, one or more servers may be provided in the communication path between the mobile device and the recipient device(s). An example functional purpose of an intermediary server may be to execute the aforementioned logic or rules. In an example embodiment, users may configure rules provided on a server of the system. The rules may filter location data received from a particular mobile device and provide outputs (e.g., communicate the location data to associated recipients) based on the rules.

Figure 1C:
FIG. 1C shows an example notification on a recipient mobile device.
Figure 1C:
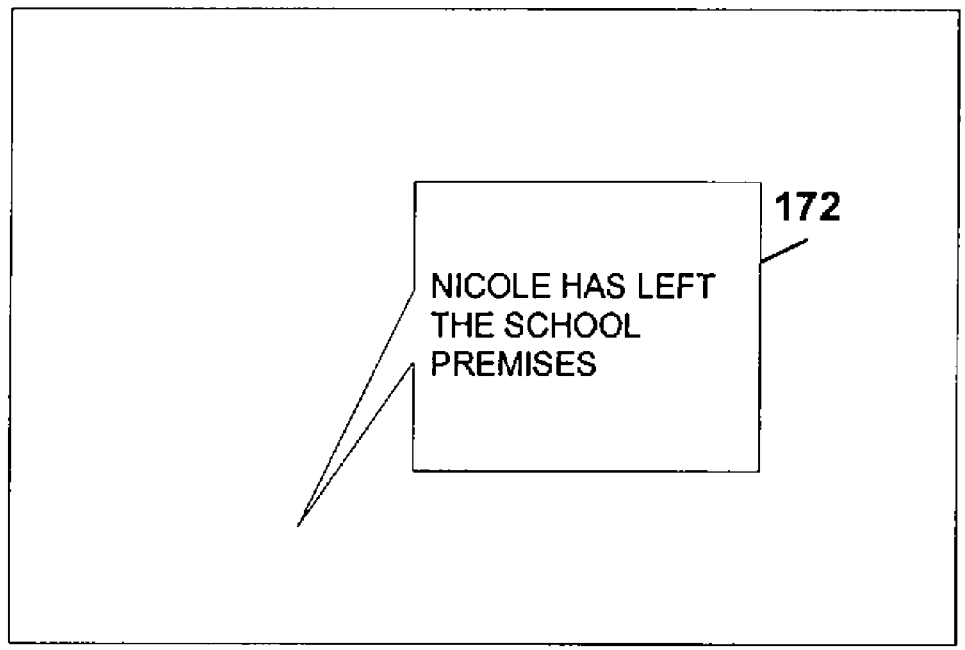

The mobile device, as mentioned above, may have a display screen for displaying the location data. For example, as shown in FIG. 1C, a graphical user interface or display pop-up 172 may be provided on a display 170 of a mobile device of the intended recipient(s). For example, if the predefined zone is a child's school premises, and the child leaves the school premises, then the pop-up 172 may appear on the display 170 of a parent's cellular telephone to alert the parent that the child (Nicole in the given example) has left the school premises.

In an example embodiment, the recipient may be provided with a map, on which is indicated the location of the mobile device (and thus details of a buddy in his or her buddy list). Alternatively, a list of icons representative of buddy's in a buddy list (identified by locations of their associated mobile devices) may be displayed. A person may then be able to, for example by means of a pointing device, identify from an icon the location of an associated buddy.

In an example embodiment, the method includes notifying the at least one predefined recipient that a battery of the mobile device is getting flat. This feature may provide an indication to the recipient that the tracking of the mobile device may shortly be disrupted.

In another example embodiment, the method includes providing a surrounding boundary, so that if the mobile device traverses the boundary, the at least one recipient can be notified. In this regard, the method may further comprise determining the location of the mobile device and communicating the location of the mobile device to the remote device of the at least one predefined recipient at predefined intervals. If and when the mobile device crosses back into the surrounding boundary, the normal reporting procedures described above will resume.

Figure 2:
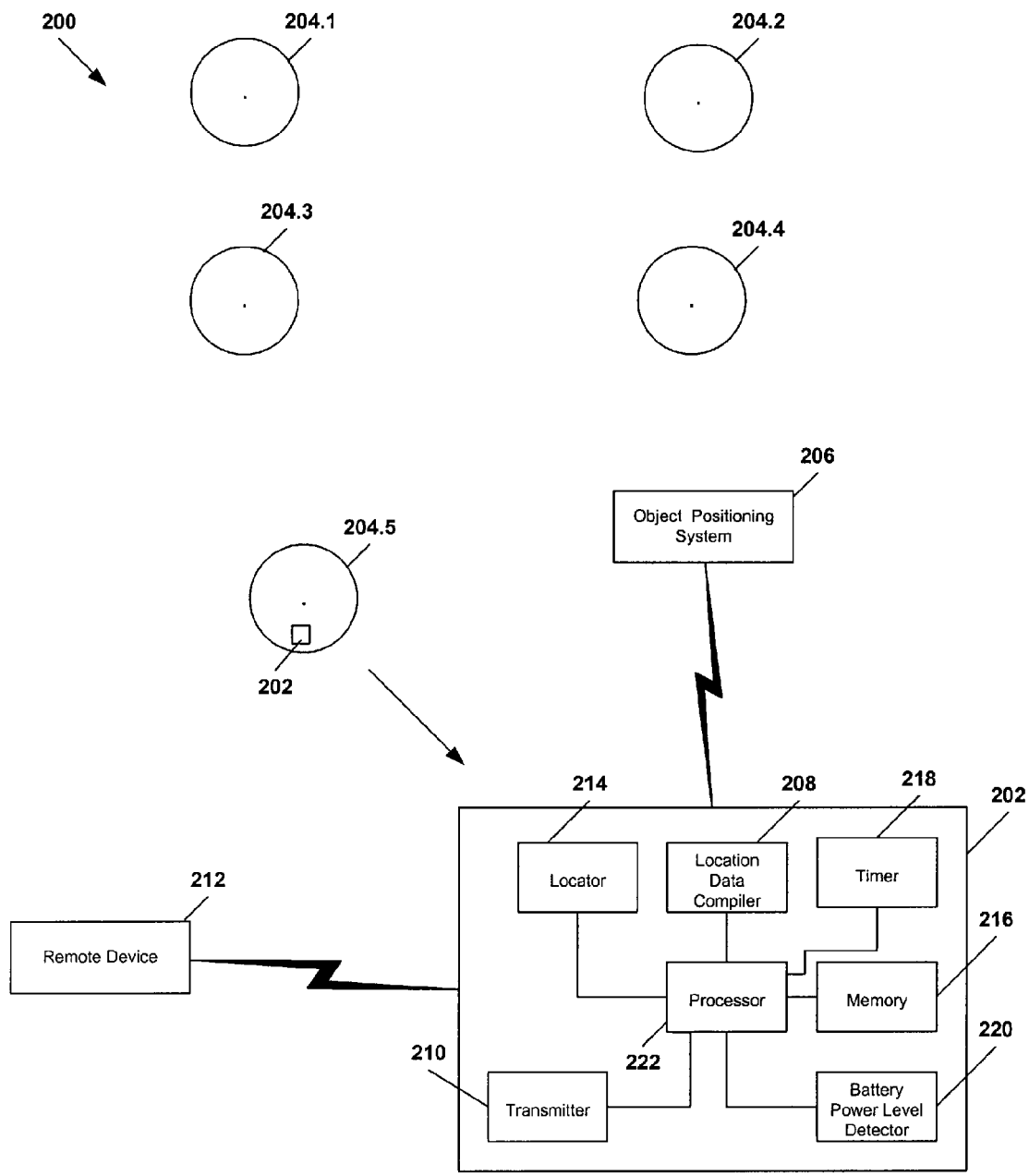
FIG. 2 shows a schematic diagram of a system, according to an example embodiment, to determine and communicate the presence of a mobile device in a predefined zone.

Turning now to FIG. 2, a system 200 is shown to detect and communicate the presence of a mobile device 202 in a predefined zone 204.5. The predefined zone 204.5 may be one of a plurality of predefined zones 204.1 to 204.5 associated with the mobile device 202 and that have been stored in the mobile device 204.5. The system 200 comprises an object positioning system 206 to determine the location of the mobile device 202. The object positioning system 206 may determine the location of the mobile device 202 at regular, predefined intervals. In an example embodiment, the object positioning system 206 may determine the coordinates of the mobile device 202. As mentioned above, the location of the mobile device may be determined one the mobile device from GPS data, using triangulation of mobile telephone base stations or any other location technology. Thus, for example, the object positioning system may use triangulation in cellular base stations to determine the location of the mobile device 202.

The system 200 may further comprise a location data compiler 208 to compile location data. The location data may include an identifier corresponding to the zone that the mobile device 202 is currently in which, in the illustrated example, is the zone 204.5. In an example embodiment, the location data compiler 208 is in communication with the object positioning system 206 and is triggered to compile the location data when the mobile device 202 enters or leaves any of the zones 204.1 to 204.5 associated with the mobile device 202. The system 200 further comprises a transmitter 210 for sending (e.g., via a cellular telephone network) the location data to at least one predefined recipient having an associated remote device 212.

In an example embodiment, the data compiler 208 and the transmitter 210 are provided in the mobile device itself. The mobile device 202 may further include a locator module 214 to receive the location (e.g., GPS data) from the object positioning system 206 of the mobile device 202. Thus, the mobile device 202 may determine its own location and compile and send the location data.

The system 200 may include a memory 216 to store the plurality of predefined zones 204.1 to 204.5 that are associated with the mobile device 202. Each predefined zone 204.1 to 204.5 may have a corresponding identifier. In an example embodiment, the memory 216 also stores a plurality of recipients (e.g., a buddy group) associated with the each zone.

In another example embodiment, the memory 216 stores a predefined label associated with each identifier of the plurality of zones 204.1 to 204.5, so that the location data can include the predefined label associated with the zone that the mobile device 202 is within. In an example embodiment, the memory 216 stores a predefined surrounding boundary, so that if the mobile device traverses the boundary, the at least one recipient can be notified. The object positioning system 206 may determine the location of the mobile device 202, with the location data compiler 208 then sending location data to the remote device 212 of the at least one predefined recipient at predefined intervals.

The system 200 may include a timer 218 so that the location data includes a timestamp corresponding to when the mobile device 202 enters or leaves any of the predefined zones associated with the mobile device 202.

In an example embodiment, the mobile device 202 includes a battery power level detector 220 so that the at least one predefined recipient can be notified when a battery of the mobile device 202 is getting flat. If the mobile device 202 runs flat or is turned off, the mobile device 202 may keep track of its most recent zone prior to it being turned off. Thus, when the mobile device 202 regains power, it may notify the recipient of any changes in its location. To achieve this, in an example embodiment, the mobile device 202 keeps its zones stored in memory, and upon regaining power, the mobile device may check for any updates to that status.

In an example application, the example method 100 and system 200 described above may be used to track children. In this example application, the recipient may be the parent of a child using a mobile device and the parent may configure the zones for the child. For example, the zones may correspond to a school, a shopping mall or a friend's home. It is to be understood that the configuration of the zones on the mobile device 202 may or may not be visible to the child carrying the mobile device. For example, in an example embodiment, the zone may form an extended visibility net (or invisible zone), where if a mobile device bearer (e.g., a child with a cellular telephone) goes past a certain preconfigured perimeter, the mobile device may automatically report exact coordinates (e.g., GPS coordinates) at predefined intervals. For example a parent may set up or define four different perimeter walls that have different labels (e.g., North, South, East, and West) in a cellular telephone. When the bearer of the cellular telephone passes through one of these invisible "fences", the cellular telephone may automatically commence sending raw coordinates (e.g., GPS coordinate) to a device associate with a parent. For example the parent may have a jabber enabled cellular telephone and, accordingly, the child's cellular telephone may send the coordinates the parent's jabber client. If child crosses back to the normal ranges, then normal reporting may once again take place.

Figure 3:
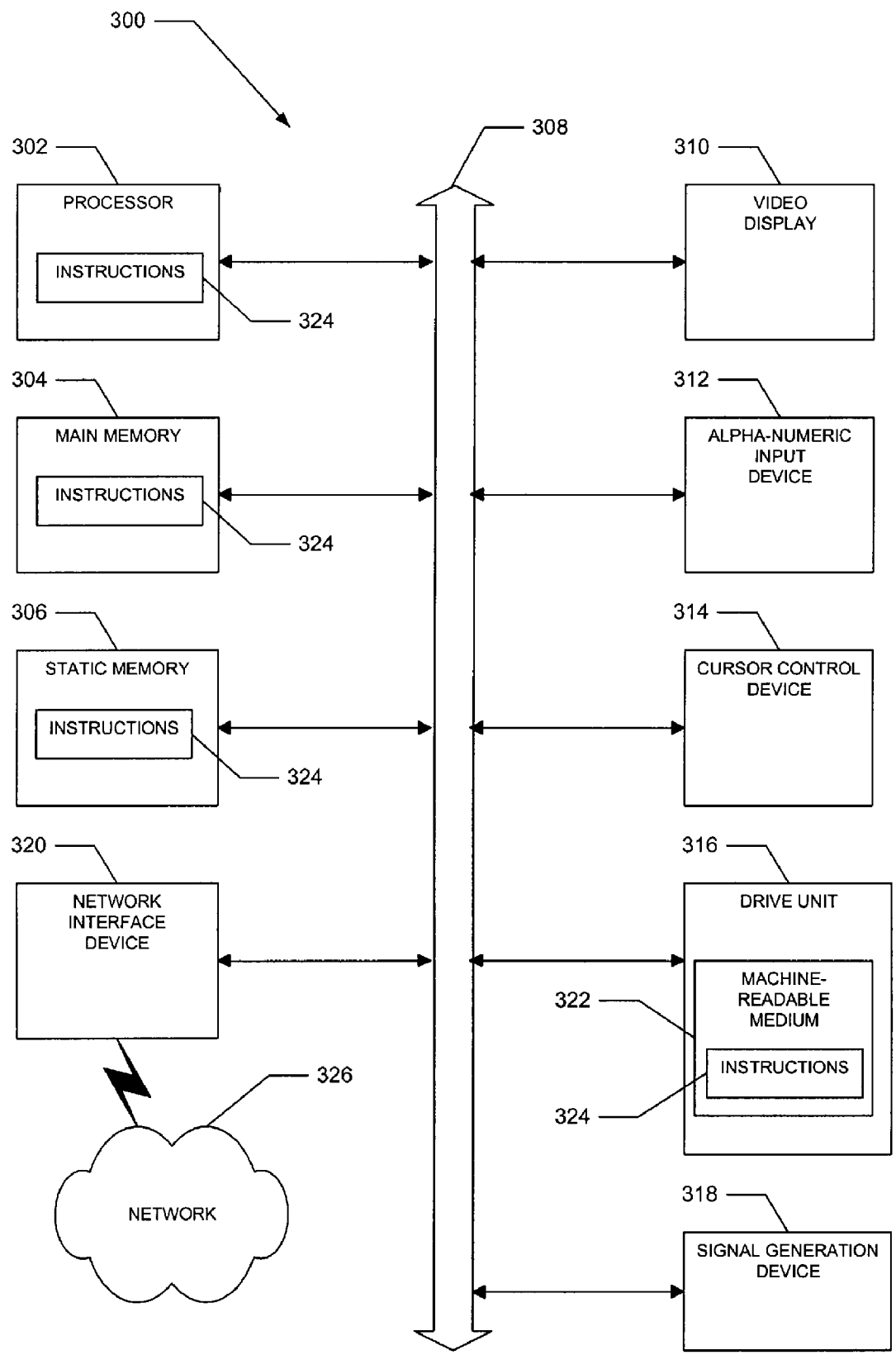
FIG. 3 shows a diagrammatic representation of machine in the example form of a computer system within which a set of instructions, for causing the machine to perform any one or more of the methodologies discussed herein, may be executed.

FIG. 3 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although the present application has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method to communicate the presence of a mobile device in at least one predefined zone, the method comprising:
   determining when the mobile device is proximate the at least one predefined zone;
   compiling location data which includes a zone identifier corresponding to the at least one predefined zone and a device identifier corresponding to the mobile device;
   identifying at least one predefined group of mobile devices associated with the at least one predefined zone; and
   sending the location data and the device identifier to all mobile devices in the at least one predefined group of mobile devices.

2. The method of claim 1, wherein the determining and the compiling are performed by the mobile device.

3. The method of claim 1, wherein the determining when the mobile device is proximate the at least one predefined zone includes at least one of determining when the mobile device enters the predefined zone and is located within the predefined zone.

4. The method of claim 1, wherein the device identifier identifies a name of a person associated with the mobile device.

5. The method of claim 1, which comprises sending the zone identifier and the device identifier via an Instant Messaging (IM) client.

6. The method of claim 1, which comprises providing a plurality of predefined zones that are associated with the mobile device, each predefined zone having a corresponding identifier.

7. The method of claim 1, which comprises identifying:
   a predefined label associated with each zone; and
   sending the predefined label as zone identifier.

8. The method of claim 1, which comprises:
   at each mobile device,
      providing a user with a Graphical User Interface (GUI);
      receiving location data and a device identifier associated with one or more mobile devices in the predefined group of mobile devices; and
      displaying the location data and the device identifier received from the one or more other mobile devices on the GUI of the mobile device.

9. The method of claim 8, in which the GUI is configured to allow the user to group mobile devices into at least one recipient group and associate the recipient group with the at least one zone.

10. The method of claim 1, which comprises providing geographical coordinate data with the location data when the mobile device is outside of the at least one predefined zone.

11. The method of claim 1, which comprises providing a timestamp with the location data, the timestamp corresponding to when the mobile device is proximate the at least one predefined zone.

12. The method of claim 1, wherein determining when the mobile device is proximate the at least one predefined zone comprises:
- determining current geographical coordinates of the mobile device using a Global Positioning System (GPS); and
- comparing the current geographical coordinates with reference geographical coordinates associated with the zone.

13. The method of claim 1, which includes the prior operation of associating a plurality of predefined zones with respective predefined groups of mobile devices, so that each predefined zone is associated with one or more predefined groups of mobile devices.

14. A method of providing a notification to a user of a mobile device, the method comprising:
- at a receiving mobile device,
  - providing a user with a Graphical User Interface (GUI) to display a group of mobile devices associated with at least one predefined zone and to identify the mobile devices in the group;
  - receiving location data of one or more sending mobile devices in the group of mobile devices, the location data including:
    - a zone identifier corresponding to the at least one predefined zone; and
    - a device identifier corresponding to the sending mobile device, the location data identifying when an associated mobile device is proximate the at least one predefined zone;
  - displaying the received location data and the received zone identifier of the associated mobile device on the mobile device to the user; and
  - sending location data and a device identifier of the receiving device to all mobile devices in the at least one group of mobile devices.

15. The method of claim 14, wherein the determining when the mobile device is proximate the at least one predefined zone comprises at least one of determining when the mobile device enters the predefined zone and is located within the predefined zone.

16. The method of claim 14, wherein the device identifier identifies a name of a person associated with the associated mobile device.

17. A mobile device comprising:
- a positioning component to determine when the mobile device is proximate at least one predefined zone associated with a predefined group of mobile devices;
- a location data compiler to compile location data which includes a zone identifier corresponding to the at least one predefined zone and a device identifier corresponding to the mobile device; and
- a transmitter to send the location data and the device identifier to all mobile devices in the predefined group of mobile devices.

18. The mobile device of claim 17, which determines at least one of when the mobile device enters the predefined zone and is located within the predefined zone to identify when the mobile device is proximate the at least one predefined zone.

19. The mobile device of claim 17, wherein the device identifier identifies a name of a person associated with the mobile device.

20. The mobile device of claim 17, which comprises an Instant Messaging (IM) client to send the zone identifier and the device identifier.

21. A mobile device comprising:
- means for determining when the mobile device is proximate the at least one predefined zone;
- means for identifying at least one predefined group of mobile devices associated with the at least one predefined zone;
- means for compiling location data which includes a zone identifier corresponding to the at least one predefined zone and a device identifier corresponding to the mobile device; and
- means for sending the location data and the device identifier to all mobile devices in the at least one predefined group of mobile devices.

22. A machine readable medium embodying instructions which, when executed by a machine, cause the machine to:
- determine when the mobile device is proximate the at least one predefined zone;
- compile location data which includes a zone identifier corresponding to the at least one predefined zone and a device identifier corresponding to the mobile device; and
- identify at least one predefined group of mobile devices associated with the at least one predefined zone; and
- send the location data and the device identifier to all mobile devices in the at least one predefined group of mobile devices.

* * * * *

UNITED STATES PATENT AND TRADEMARK OFFICE
CERTIFICATE OF CORRECTION

PATENT NO.       : 7,586,877 B2                                    Page 1 of 1
APPLICATION NO.  : 11/279714
DATED            : September 8, 2009
INVENTOR(S)      : Gits et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 5 days.

Signed and Sealed this

Twenty-first Day of September, 2010

David J. Kappos
*Director of the United States Patent and Trademark Office*